US009607224B2

(12) United States Patent
Tsai et al.

(10) Patent No.: US 9,607,224 B2
(45) Date of Patent: Mar. 28, 2017

(54) ENTITY BASED TEMPORAL SEGMENTATION OF VIDEO STREAMS

(71) Applicant: Google Inc., Mountain View, CA (US)

(72) Inventors: Min-hsuan Tsai, Grapevine, TX (US); Sudheendra Vijayanarasimhan, Mountain View, CA (US); Tomas Izo, San Francisco, CA (US); Sanketh Shetty, Sunnyvale, CA (US); Balakrishnan Varadarajan, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 48 days.

(21) Appl. No.: 14/712,071

(22) Filed: May 14, 2015

(65) Prior Publication Data

US 2016/0335499 A1    Nov. 17, 2016

(51) Int. Cl.
  *G06K 9/34*    (2006.01)
  *G06K 9/00*    (2006.01)
  *H04N 5/91*    (2006.01)
  *G06K 9/66*    (2006.01)
  *G06K 9/62*    (2006.01)

(52) U.S. Cl.
  CPC ....... *G06K 9/00765* (2013.01); *G06K 9/6269* (2013.01); *G06K 9/66* (2013.01); *H04N 5/91* (2013.01)

(58) Field of Classification Search
  CPC .... G06K 9/00765; G06K 9/66; G06K 9/6269; H04N 5/91
  See application file for complete search history.

(56) References Cited

U.S. PATENT DOCUMENTS 7,042,525 B1*  5/2006  Yu .................... G06F 17/30814
                                                348/700
7,559,017 B2*  7/2009  Datar ............... G06F 17/30817
                                                715/201

(Continued)

OTHER PUBLICATIONS

Fu, Y. et al., "Temporal Segmentation of Video Objects for Hierarchical Object-Based Motion Description," IEEE Transactions on Image Processing, vol. 11, No. 2, Feb. 2002, pp. 135-145.

(Continued)

*Primary Examiner* — John Strege
(74) *Attorney, Agent, or Firm* — Fenwick & West LLP

(57) ABSTRACT

A solution is provided for temporally segmenting a video based on analysis of entities identified in the video frames of the video. The video is decoded into multiple video frames and multiple video frames are selected for annotation. The annotation process identifies entities present in a sample video frame and each identified entity has a timestamp and confidence score indicating the likelihood that the entity is accurately identified. For each identified entity, a time series comprising of timestamps and corresponding confidence scores is generated and smoothed to reduce annotation noise. One or more segments containing an entity over the length of the video are obtained by detecting boundaries of the segments in the time series of the entity. From the individual temporal segmentation for each identified entity in the video, an overall temporal segmentation for the video is generated, where the overall temporal segmentation reflects the semantics of the video.

14 Claims, 9 Drawing Sheets

(56) References Cited

U.S. PATENT DOCUMENTS

| | | | |
|---|---|---|---|
| 7,653,635 B1* | 1/2010 | Paek | G06F 17/30038 707/999.1 |
| 2001/0005430 A1* | 6/2001 | Warnick | G06T 7/0081 382/173 |
| 2001/0020981 A1 | 9/2001 | Jun et al. | |
| 2007/0025615 A1* | 2/2007 | Zhou | G06K 9/00765 382/173 |
| 2007/0201558 A1* | 8/2007 | Xu | G06K 9/6218 375/240.22 |
| 2008/0316307 A1* | 12/2008 | Petersohn | G06K 9/00765 348/135 |
| 2009/0116702 A1* | 5/2009 | Conradt | G06K 9/00711 382/118 |
| 2009/0278937 A1* | 11/2009 | Botchen | G06K 9/00771 348/169 |
| 2010/0039564 A1 | 2/2010 | Cui et al. | |
| 2012/0063746 A1* | 3/2012 | Han | G06K 9/00765 386/278 |
| 2014/0023341 A1* | 1/2014 | Wang | H04N 9/87 386/240 |
| 2014/0245152 A1* | 8/2014 | Carter | G11B 27/28 715/720 |
| 2015/0050006 A1* | 2/2015 | Sipe | G06K 9/00711 386/241 |
| 2015/0082349 A1* | 3/2015 | Ishtiaq | H04N 21/23418 725/40 |
| 2015/0229996 A1* | 8/2015 | Jo | H04N 21/47205 725/37 |
| 2015/0363635 A1* | 12/2015 | Suri | G06K 9/00268 386/241 |
| 2016/0012296 A1* | 1/2016 | Xing | G06K 9/00765 386/241 |

OTHER PUBLICATIONS

Naphade, M. et al., "A Factor Graph Framework for Semantic Video Indexing," IEEE Transactions on Circuits and Systems for Video Technology, vol. 12, No. 1, Jan. 2002, pp. 40-52.

Dabhi, A., et al., "A Neural Network Model for Automatic Image Annotation Refinement," International Journal of Emerging Technologies and Innovative Research, vol. 1, Issue 6, Nov. 2014, pp. 561-564.

PCT International Search Report and Written Opinion for PCT/US2016/027330, Aug. 30, 2016, 10 Pages.

* cited by examiner

ENTITY BASED TEMPORAL SEGMENTATION OF VIDEO STREAMS

BACKGROUND

The described embodiments relate generally to video processing, and more particularly to entity based temporal segmentation of video streams.

The sharing of videos with a variety of different content and encoded in different formats through hosting services such as YOUTUBE represents a growing need for effective organization, indexing and management. Most of the existing solutions for video browsing and retrieval are shot-based, where a video stream is temporally segmented into shots. A shot of a video stream is an unbroken sequence of video frames of the video stream taken from one camera; two temporally adjacent segments using shot-based temporal segmentation are visually different.

There exist many multimedia applications that are directed to the semantics of video scenes than to temporal visual differences between adjacent shots. One challenge in shot-based temporal segmentation is to link the raw low level video data with high level semantic fields of a video stream, e.g., finding appropriate representations for the visual content which reflects the semantics of the video. Taking the contiguous shot of an aircraft flying towards a runway and landing as an example, on the semantic level, the contiguous shot includes two scenes: one describing the aircraft flying and the other about the aircraft landing. A shot-based segmentation may not differentiate between the two scenes if the transition between the two scenes is smooth.

SUMMARY

Described methods, systems and computer program products provide solutions for temporally segmenting a video based on analysis of entities identified in the video frames of the video.

One embodiment includes a computer-implemented method for temporally segmenting a video. The method comprises the steps of decoding the video into multiple video frames. Multiple video frames are selected for annotation. The annotation process identifies entities present in a sample video frame and each identified entity has a timestamp and confidence score indicating the likelihood that the entity is accurately identified. For each identified entity, a time series comprising of timestamps and corresponding confidence scores is generated and smoothed to reduce annotation noise. One or more segments containing an entity over the length of the video are obtained by detecting boundaries of the segments in the time series of the entity. From the individual temporal segmentation for each identified entity in the video, an overall temporal segmentation for the video is generated, where the overall temporal segmentation reflects the semantics of the video.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

I. System Overview

Figure 1:
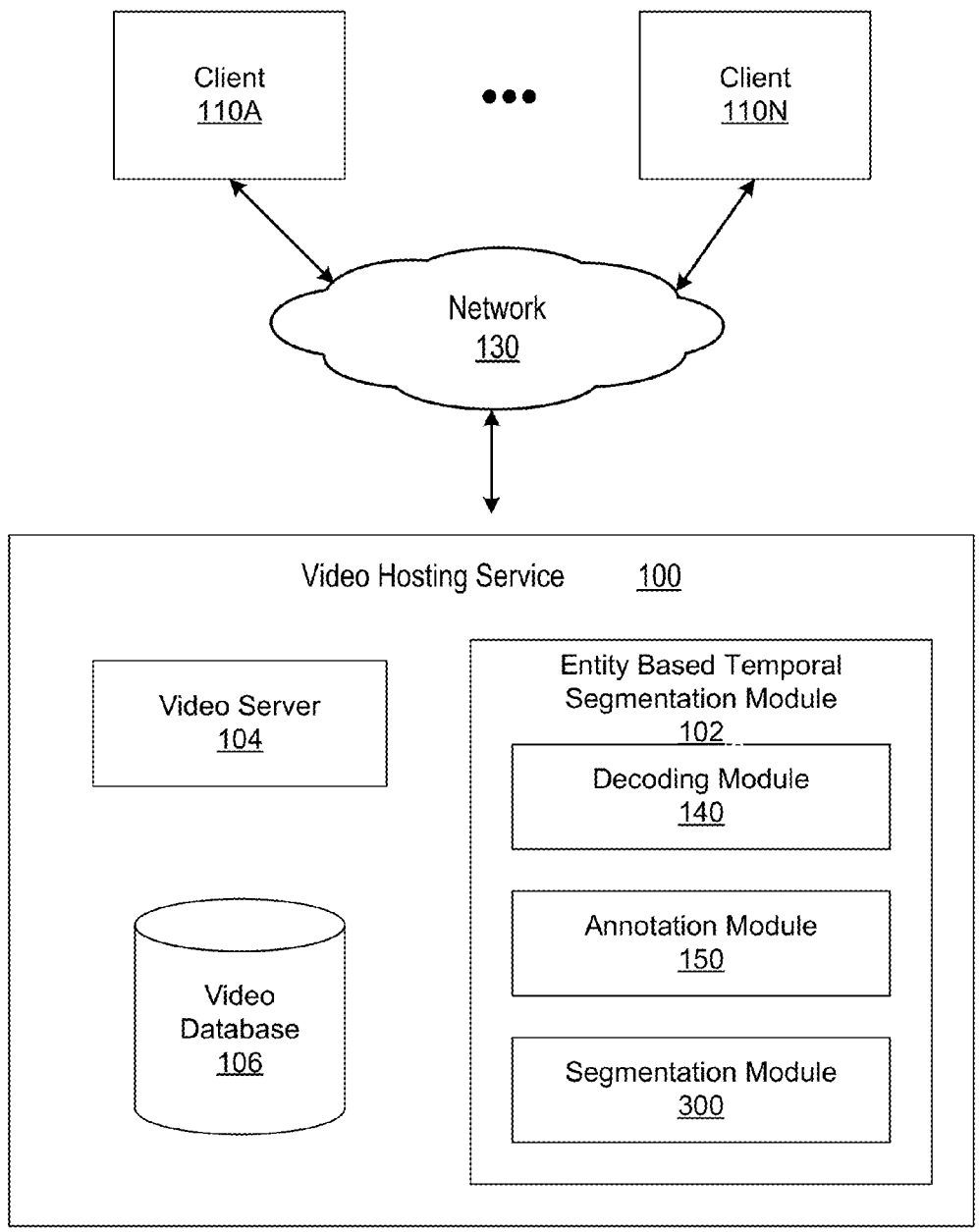
FIG. 1 is a block diagram illustrating a system view of a video hosting service having an entity based temporal segmentation module according to one embodiment.

FIG. 1 is a block diagram illustrating a system view of a video hosting service 100 having an entity based temporal segmentation module 102 according to one embodiment. Multiple users/viewers use client 110A-N to use services provided by the video hosting service 100, such as uploading and retrieving videos from a video hosting website, and receive the requested services from the video hosting service 100. The video hosting service 100 communicates with one or more clients 110A-N via a network 130. The video hosting service 100 receives the video hosting service requests for videos from clients 110A-N, segments and indexes the videos by the entity based temporal segmentation muddle 102 and returns the requested videos to the clients 110A-N.

In one embodiment, a client 110 is used by a user to request video hosting services. For example, a user uses a client 110 to send a request for indexing or storing an uploaded video. The client 110 can be any type of computer device, such as a personal computer (e.g., desktop, notebook, laptop) computer, as well as devices such as a mobile telephone, personal digital assistant, IP enabled video player. The client 110 typically includes a processor, a display device (or output to a display device), a local storage, such as a hard drive or flash memory device, to which the client 110 stores data used by the user in performing tasks, and a network interface for coupling to the video hosting service 100 via the network 130. A client 110 also has a video player for playing a video stream.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100.

The video hosting service 100 comprises an entity based temporal segmentation module 102, a video server 104 and a video database 106. The video server 104 serves the videos from the video database 106 in response to user video hosting service requests. The video database 106 stores user uploaded videos, video collected from the Internet and videos segmented by the entity based temporal segmentation module 102. In one embodiment, the video database 106 stores a large video corpus for the entity based temporal segmentation module 102 to train an annotation model.

The entity based temporal segmentation module 102 segments an input video into multiple temporal semantic segments based on analysis of one or more entities that are present in the video frames of the input video. An entity in a video frame represents a semantically meaningful spatial-temporal region of the video frame. For example, a frame of a video of a cat playing with a dog may contain a dog, or a cat or both dog and cat, where the dog and/or the cat are the entities of the video frame. Two temporally adjacent semantic segments of an input video contain different scenes in terms of semantics of the segments, e.g., a dog scene versus a cat scene.

In one embodiment, the entity based temporal segmentation 102 has a decoding module 140, an annotation module 150 and a segmentation module 300. The decoding module 140 decodes an input video, and the decoded video has multiple video frames. Any decoding schemes known to those of ordinary skills in the art can be used by the decoding module 140 at the discretion of the implementer. In one embodiment, the decoding module 140 decodes the input video by performing an inversion of each stage of the corresponding encoding process that encodes the input video according to a video compression standard, including inverse transform (discrete cosine transform or wavelet transform), inverse quantization and inverse entropy encoding of the signals of the input video.

The annotation module 150 selects multiple video frames from the decoded video and annotates each selected video frame. In one embodiment, the annotation module 150 selects the video frames based on timing information, e.g., selecting a video frame every 5 seconds of the input video, or location, e.g., selecting every tenth video frame according to a display order of the decoded video frames. To annotate a selected video frame, the annotation module 150 identifies the entities in the selected video frame and assigns a confidence score for each identified entity. In one embodiment, the annotation module 150 applies a trained annotation model to each video frame of the input video and generates a set of annotation parameters describing each identified entity, e.g., a class label, a bounding box containing the identified entity and a confidence score. The class label of an identified entity describes the entity in a human readable manner, e.g., descriptive text of the entity. The bounding box containing the identified entity defines an area in a video frame that contains the identified entity. The bounding box is defined by its size and width and coordinates of one of its corner pixels. The confidence score associated with an entity indicates likelihood that the entity is accurately identified, e.g., the identified dog in the video frame has a 90% probability of being a dog. An entity having a higher confidence score in a video frame is more likely to be present in the video frame than in another video frame where the same entity has a lower confidence score.

In one embodiment, the annotation module 150 trains the annotation model using an annotation training framework, such as DisBelief framework, which trains deep neural network models in a distributed manner with rapid iterations using videos stored in the video database 106. For example, the annotation module 150 trains the annotation model using an asynchronous stochastic gradient descent procedure and a variety of distributed batch optimization procedure on computing clusters with thousands of machines on a data set of 16 million images and 21 thousand categories. The annotation module 150 extracts visual features from the training images, learns the invariant features of the extracted visual features and builds the training model from the learning of the visual features. Other embodiments of the annotation module 150 may use other machine learning techniques to train the annotation model.

Figure 2:
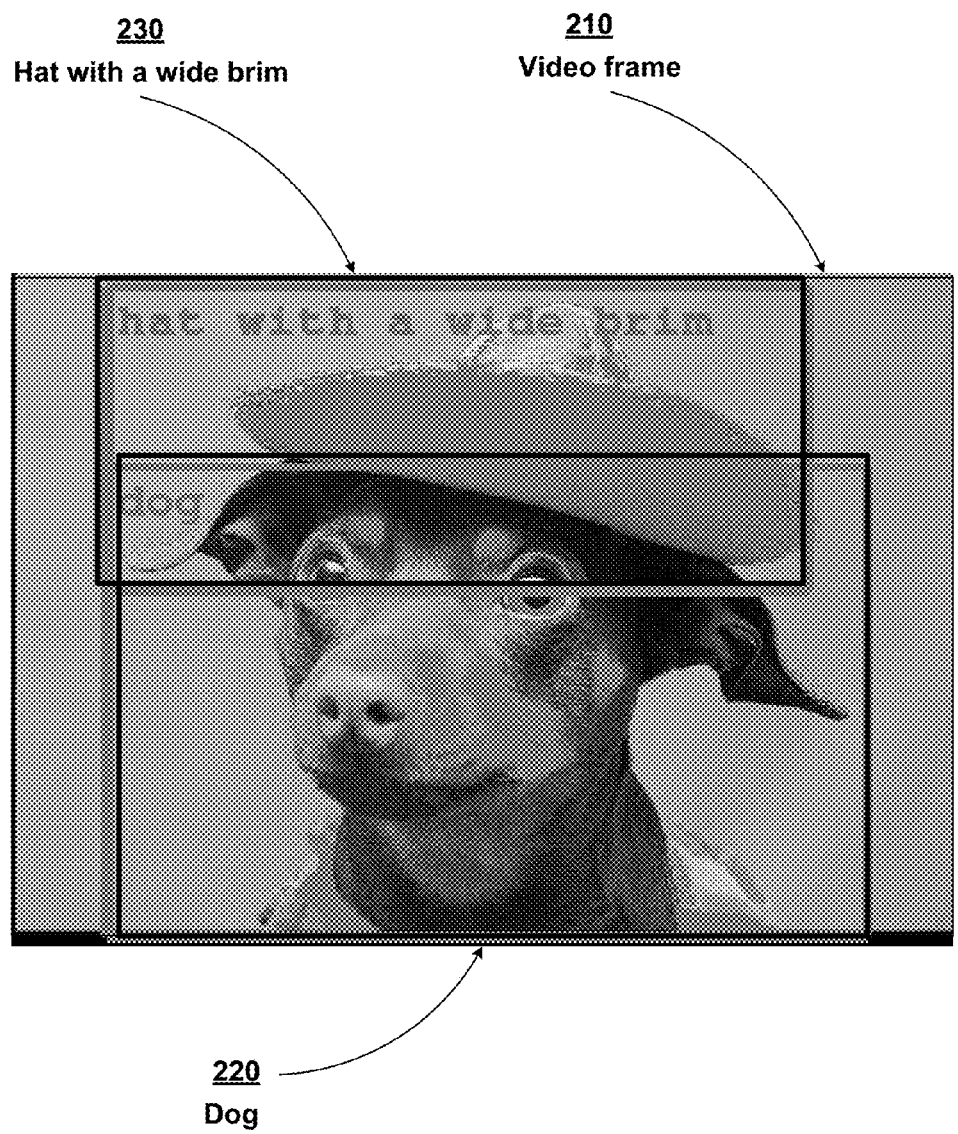
FIG. 2 is an example of a video frame having a dog wearing a hat and corresponding annotation for the dog and the hat.

FIG. 2 is an example of a video frame 810 having a dog 220 wearing a hat 230 and corresponding annotation for the dog and the hat. The annotation module 150 applies the trained annotation model to the video frame 210. Based on the application, the annotation module 150 identifies two entities in the video frame 210: a dog 220 and a hat 230 with a wide brim. For each identified entity, the annotation module 150 identifies the entity with a class label, e.g., a dog, a hat, and a bounding box containing the identified entity. The annotation module 150 also assigns a confidence score (not shown) for each identified entity based on the analysis of the visual features associated with the entity by the trained annotation model.

The segmentation module 300 segments the input video into multiple temporal semantic segments based on analysis of one or more identified entities in the video frames of the input video. In one embodiment, the segmentation module 300 generates an overall temporal segmentation of the input video based the temporal segmentation for each identified entity of the input video and combines the temporal segmentation of all the identified entities of the input video to generate the overall temporal segmentation for the entire input video. The segmentation module 300 is further described below with reference to FIGS. 3-8.

II. Entity Based Temporal Semantic Segmentation

Figure 3:
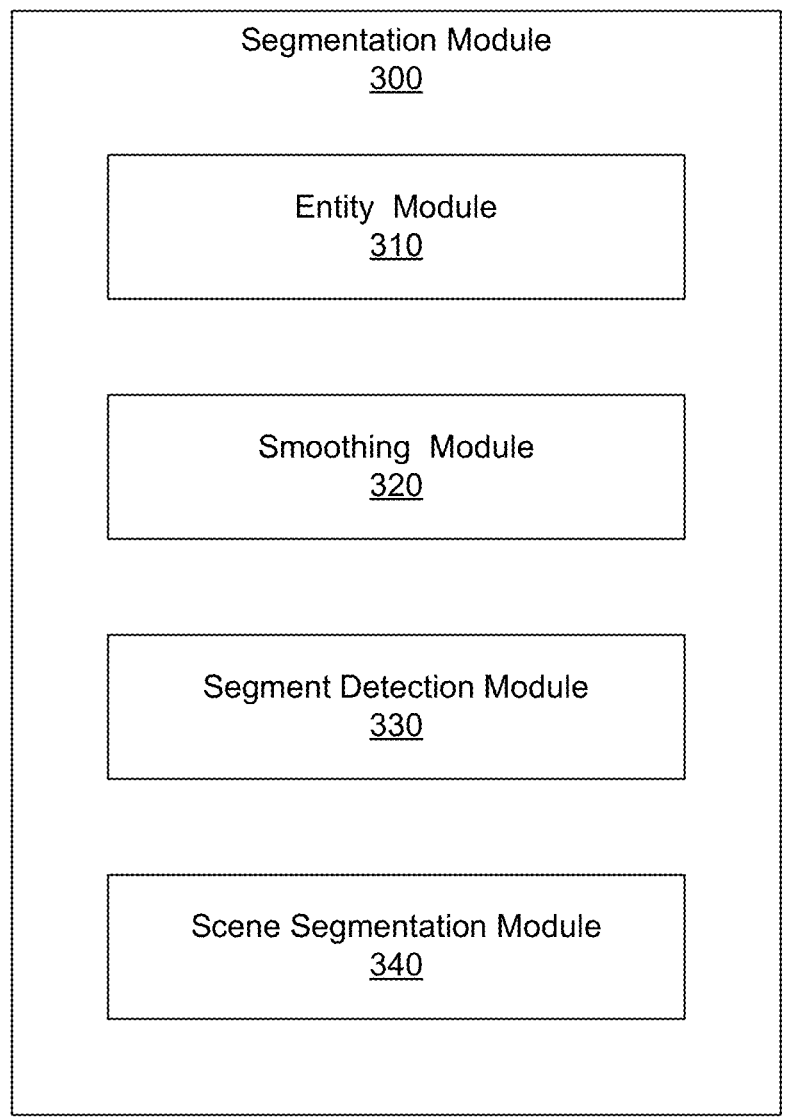
FIG. 3 is a block diagram illustrating a segmentation module according to one embodiment.

FIG. 3 is a block diagram illustrating a segmentation module 300 according to one embodiment. The embodiment of the segmentation module 300 in FIG. 3 includes an entity module 310, a smoothing module 320, a segment detection module 330 and a scene segmentation module 340. Those of skill in the art will recognize that other embodiments of the segmentation module 300 can have different and/or other modules than the ones described here, and that the functionalities can be distributed among the modules in a different manner.

The entity module 310 interacts with the annotation module 150 of the segmentation module 150 to receive identified entities and their corresponding confidence scores and generates a time series for each identified entity with corresponding confidence scores over the entire length of the input video. In one embodiment, the entity module 310 denotes the time series of an identified entity as $S_e$, where parameter e represents the identified entity in a video frame. The time series $S_e$ includes a series of pairs $\{t_{S_i}, f(t_{S_i})\}$, where parameter i refers to the frame number, parameter $t_{S_i}$ is the timestamp of the ith frame and $f(t_{S_i})$ refers to the confidence score of the entity e at timestamp $t_{S_i}$.

Figure 4:
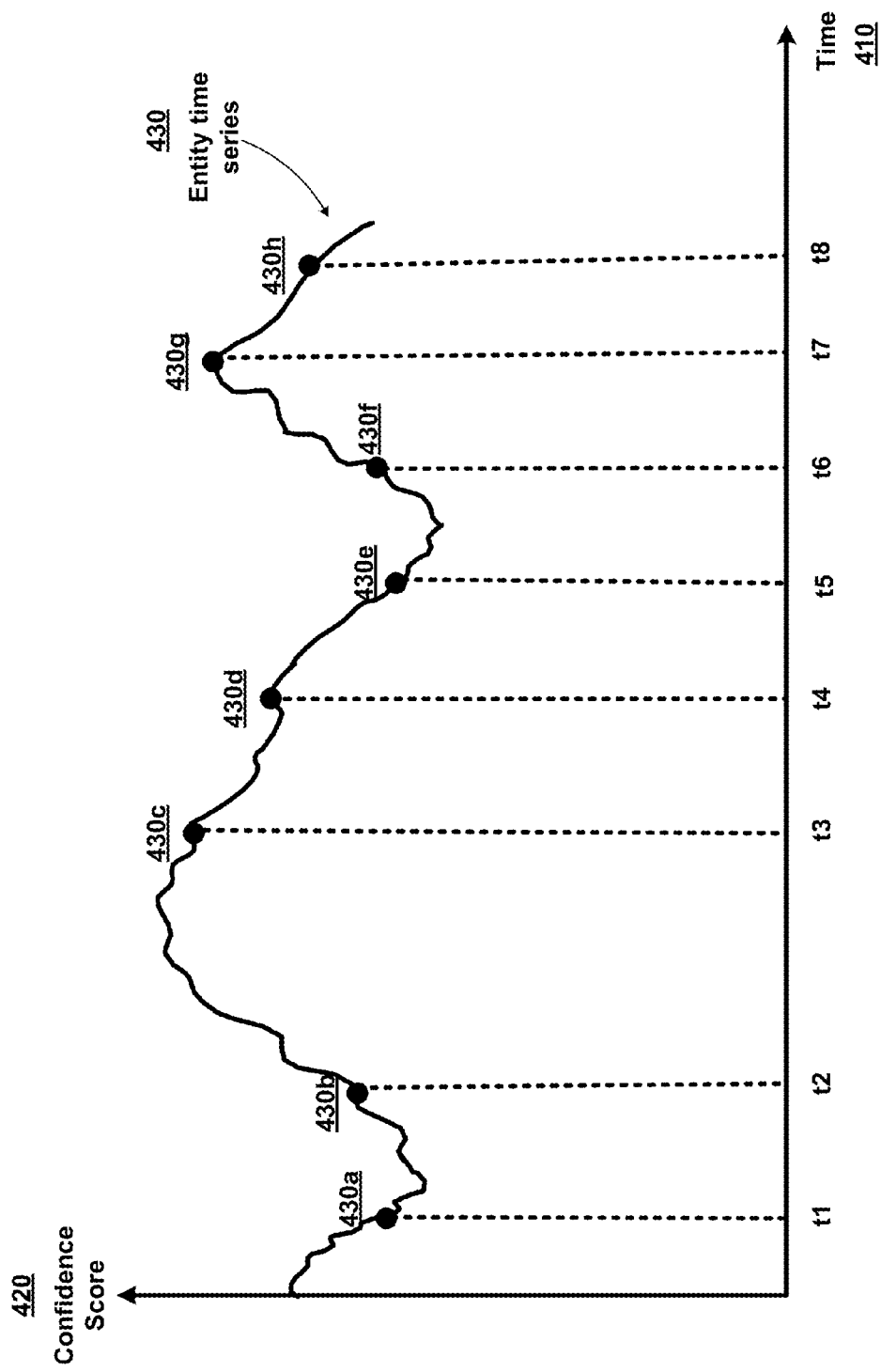
FIG. 4 illustrates an example of time series of an identified entity in a video and corresponding confidence scores of the entity at various time instances in the video.

Referring now to FIG. 4, FIG. 4 illustrates an example of time series of an identified entity in an input video and corresponding confidence scores of the entity at various time instances of the input video. FIG. 4 shows a time series 430 of one identified entity, e.g., a dog in a video of a cat playing with the dog, over the entire length of the input video. The horizontal axis 410 represents the timing information of the time series 430, e.g., the length of the video and timestamps of the video frames of the video, and the vertical axis 420 represents the confidence scores (e.g., 430a-420h) associated with the entity at each time instance. For example, the frame at time instance $t_1$ has a confidence score 430a, which represents the likelihood of the frame at time instance $t_1$ having the identified entity in the video frame.

The smoothing module 320 removes potentially spurious segments by applying a smoothing function to the time series for each identified entity of the input video. An entity in a video frame of a video may be misidentified based on raw visual features of the video due to noise, e.g., motion blur caused by camera shake when capturing the input video. Thus, the confidence scores for an identified entity over the entire length of the input video may vary a lot due to small changes in temporally subsequence frames, which may lead to spurious segments of the input video.

In one embodiment, the smoothing module 320 uses a moving window to smooth the time series for each identified entity to generate smoothed time series for each identified entity. The moving window is defined by a size and a step. The moving window over a time series of an entity selects the confidences scores of the entity to be smoothed. The smoothing module 320 averages the confidences scores within the moving window to generate an averaged confidence score, which represents the smoothed confidence score of the entity within the moving window. The smoothing module 320 moves the window to next portion of the time series of the entity for smoothing the confidence scores within the next portion of the time series.

Figure 5:
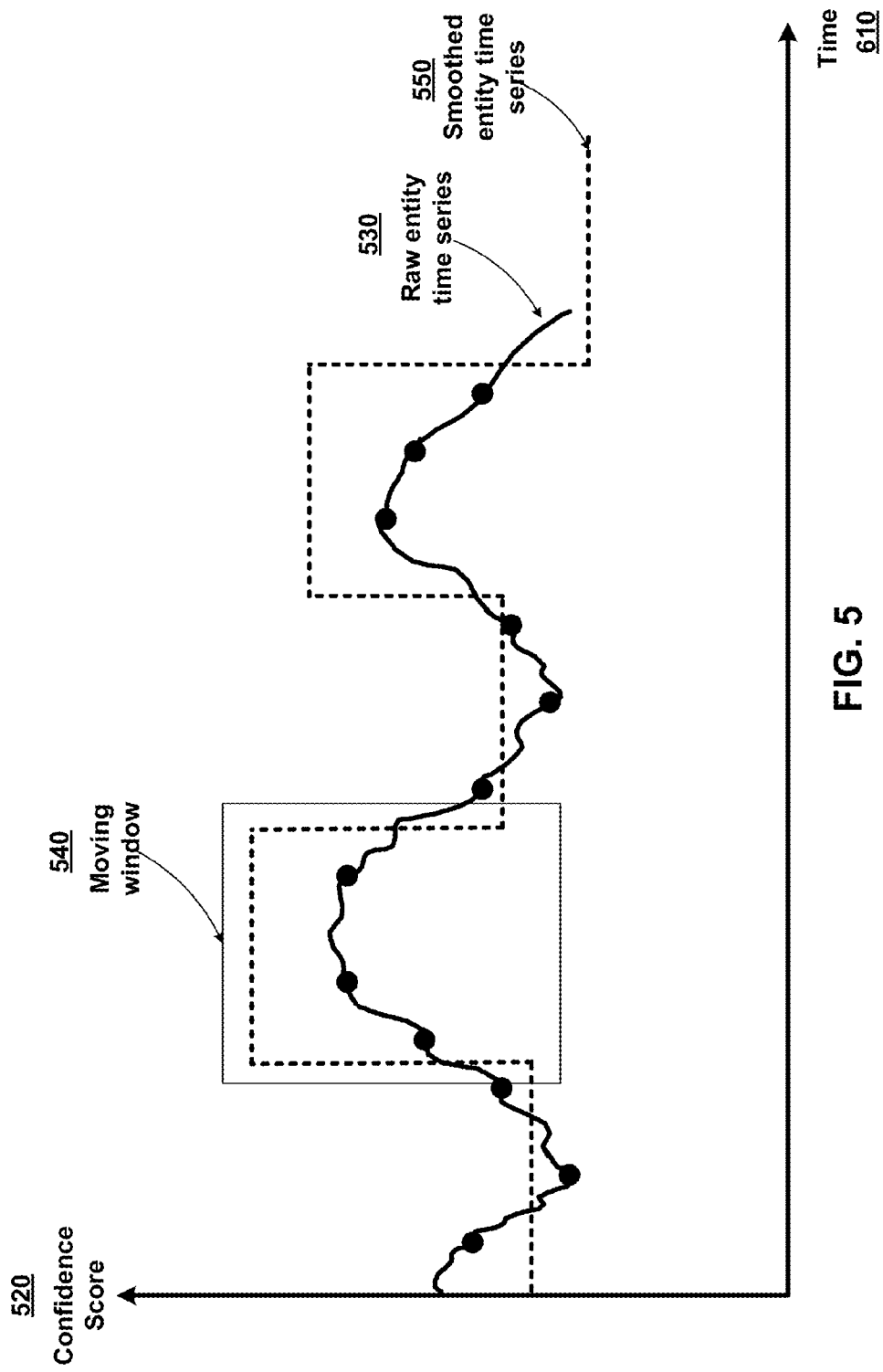
FIG. 5 is an example of applying a smoothing function to a time series of an identified entity in a video.

FIG. 5 is an example of applying a smoothing function to a time series of an identified entity in a video. The raw time series for the identified entity is represented by the smooth and continuous curve 530. The smoothing function is an averaging function that averages the confidences scores within a moving window 540 defined by its size and step. The smoothed time series for the entity is represented by the curve 550, which removes the annotation noise in the video frames of the input video.

The segment detection module 330 detects segments for each identified entity in the input video. In one embodiment, the segment detection module 330 detects edges in a video frame by detecting boundaries for segments containing an identified entity in the time series of the identified entity. The segment detection module 330 sorts the confidences scores associated with the smoothed time series of an identified entity in an ascending order of the timestamps of the time series, starting from the first timestamp selected by the segment detection module 330. The segment detection module 330 detects a pair of boundaries for a segment in the time series based on predefined onset and offset threshold values. An onset threshold value of a boundary of a segment indicates the start of the segment that contains the identified entity; an offset threshold value for the identified entity indicates the end of the segment that contains the identified entity. The video frames between the time instances associated with the start and end of the segment form a segment that contains the identified entity. The identified entity in the video frames captured between the corresponding time instances has a smoothed confidence score equal to or larger than the onset threshold value.

To determine the length of a segment for an identified entity, the segment detection module 330 determines whether to start a new segment or conclude a current segment at a time instance based on the derivatives of confidence scores associated with two consecutive timestamps. In one embodiment, the segment detection module 330 computes the derivative as the difference between the confidence scores at two consecutive timestamps as follows in Equation (1):

$$\text{derivative} = f(t_{S_i}) - f(t_{S_i} + \Delta t) \tag{1}$$

where $f(t_{S_i})$ represents the confidence score at timestamp $t_{S_i}$ and $f(t_{S_i}+\Delta t)$ represents the confidence score at next timestamp $(t_{S_i}+\Delta t)$ and the two timestamps are assumed to be uniformly spaced by $\Delta t$ in time. The segment detection module 330 compares the calculated derivative with a first derivative threshold value (also referred to as "onset derivative threshold value"). Responsive to the calculated derivative exceeding the onset derivative threshold value, the segment detection module 330 starts a new segment for the identified entity.

Similarly, the segment detection module 330 may compare the calculated derivative with a second derivative threshold value (also referred to as "offset derivative threshold value"). Responsive to the calculated derivative being smaller than the offset derivative threshold value, the segment detection module 330 concludes a current segment for the entity.

Figure 6:
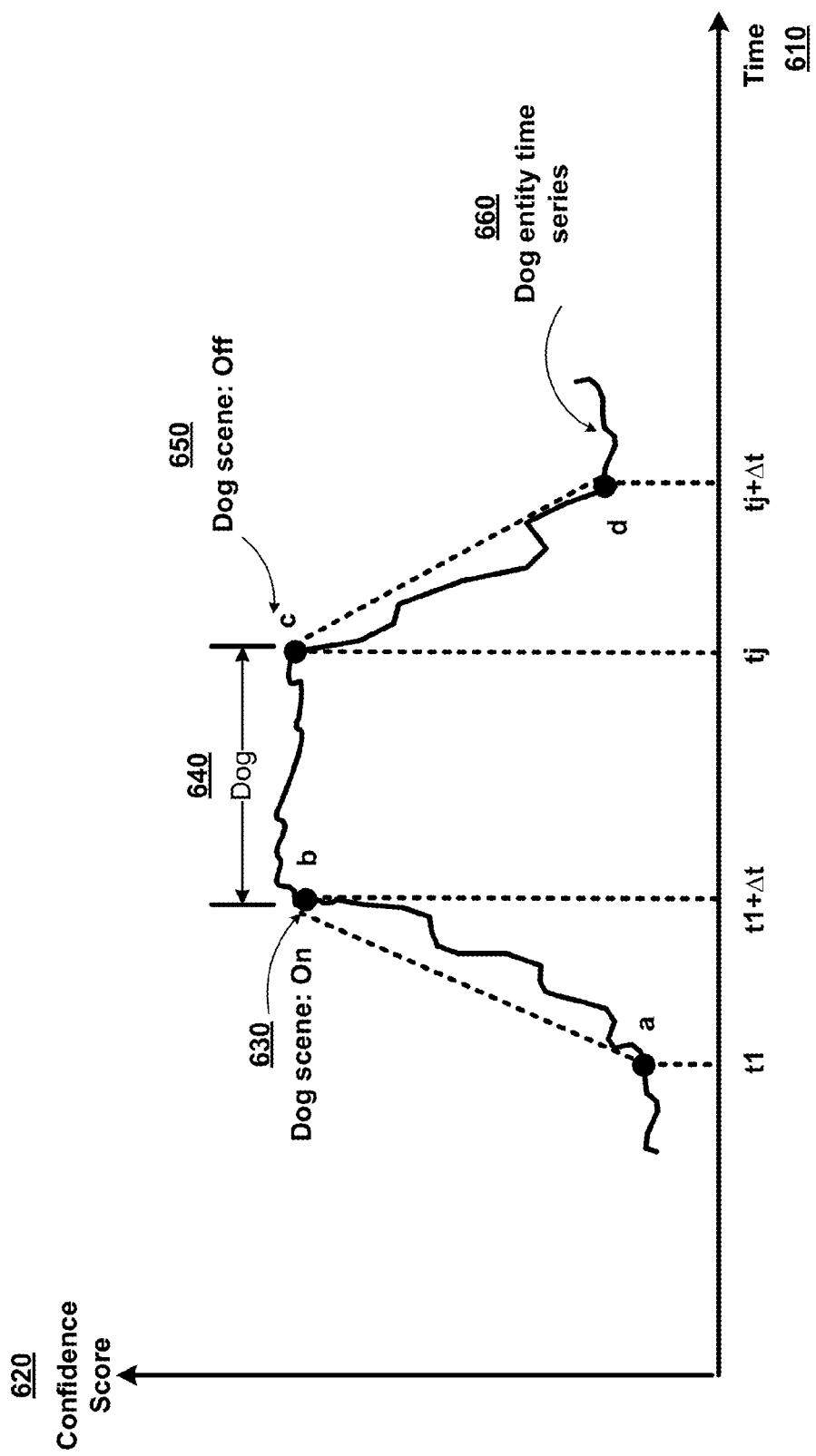
FIG. 6 is an example of detecting segment boundaries for an identified entity in a video.

FIG. 6 shows an example of detecting segment boundaries for an identified entity, e.g., dog, in a video, based on configurable onset derivative threshold value and the offset derivative threshold value. The time series for the dog entity is represented by the curve 660. The entity at time instance $t_{1+\Delta t}$ has a corresponding confidence score b, which is selected as the onset threshold value indicating the start 630 of a segment for the dog entity. The entity at time instance $t_j$ has a corresponding confidence score c, which is selected as the offset threshold value indicating the end 650 of the segment for the dog entity. The video frames between the time instances $t_{1+\Delta t}$ and $t_j$ form a segment that contains the dog entity. Each dog entity in the video frames captured between the time instances $t_{1+\Delta t}$ and $t_j$ has a confidence score equal to or larger than the onset threshold value, i.e., the confidence score b.

Assuming the time instances at $t_1$ and $t_{1+\Delta t}$ are consecutive, the segment detection module 330 calculates the derivative of the confidence scores between $t_1$ and $t_{1+\Delta t}$ according to Equation (1) above. The segment detection module 330 compares the calculated derivative with a predetermined onset derivative threshold value. In the example in FIG. 6, the derivative of the confidence scores between $t_1$ and $t_{1+\Delta t}$ exceeds the predetermined onset derivative threshold value. The segment detection module 330 determines that a new segment for the dog entity starts at the time instance $t_{1+\Delta t}$.

Similarly, the segment detection module 330 computes the derivative of the confidence scores between $t_j$ and $t_{j+\Delta t}$ according to Equation (1) above and compares the calculated derivative with a predetermined offset derivative threshold value. In the example in FIG. 6, the derivative of the confidence scores between $t_j$ and $t_{j+\Delta t}$ is below the predetermined offset derivative threshold value. The segment detection module 330 determines that the segment for the dog entity ends at the time instance $t_j$.

It is noted that the onset derivative threshold value and the offset derivative threshold value are configurable. In one embodiment, the segment detection module 330 selects the onset derivative threshold value and the offset derivative threshold value based on video segmentation experiments with selected videos stored in the video database 106, where the selected videos have known segmentation information and represent ground truth to derive onset and offset derivative threshold values. In another embodiment, the entity segment detection module 330 selects the onset derivative threshold value based on a selected percentile of ascending ordered positive derivatives of confidence scores; the segment detection module 330 selects the offset derivative threshold value based on a selected percentile of descending ordered negative derivatives of confidence scores.

To further illustrate the percentile based onset/offset derivative threshold selection, assuming that the ordered derivatives of a time series for an entity is the following:

{−0.9, −0.6, −0.5, −0.3, −0.1, 0, 0, 0, 0, 0.1, 0.2, 0.3, 0.3, 0.5}, where the ascending ordered positive derivatives are {0, 0, 0, 0, 0.1, 0.2, 0.3, 0.3, 0.5} and the descending ordered negative derivatives are {−0.1, −0.3, −0.5, −0.6 −0.9}, the segment detection module 330 selects a percentile of 0.3 of the ascending ordered positive derivatives as the onset threshold value and select a percentile of 0.3 of the descending ordered negative derivatives as the offset threshold value. The percentile of 0.3 of the ascending ordered positive derivatives sets the onset derivative threshold value to 0.2, while the percentile of 0.3 of the descending ordered negative derivatives sets the offset derivative threshold value to −0.3. The onset derivative threshold value indicates the start of a segment for the entity and the offset derivative threshold value indicates the end of the segment for the entity.

In yet another embodiment, the segment detection module 330 calculates a percentage reduction in confidence scores between two consecutive timestamps as follows in Equation (2):

$$\text{Percentage\_Reduction} = \frac{\{f(t_{S_i}) - f(t_{S_i} + \Delta t)\}}{f(t_{S_i})} \quad (2)$$

The segment detection module 230 selects a threshold value for the percentage reduction and compares the calculated Percentage_Reduction with the selected threshold value. Responsive to the calculated Percentage_Reduction being smaller than the selected threshold value, the segment detection module 230 concludes the segment at the timestamp $t_{S_i}$.

To prevent unnecessary segmentation due to a few missing video frames in the segmentation process for an entity, the segment detection module 330 merges segments that are temporally close during a cool-off period. The cool-off period can last a period of time, e.g., five seconds, depending on a variety of factors, such as the characteristics of the content of the input video, available computing resources (e.g., number of computer processors). During the cool-off period, a segment for an entity is allowed to continue even if the condition indicating the end of the segment described above is met.

An input video often has many video frames and lasts for some time. Each of the video frames may contain more than one entity in the video frame. The embodiments described above disclose generating the individual segmentation for each identified entity. The scene segmentation module 340 generates an overall segmentation of the entire input video based on the individual segmentation for each identified entity. The overall segmentation of the input video includes one or more temporal semantic segments, each of which has a set of entities; any two neighboring segments have sets of different entities.

In one embodiment, the segmentation module 300 has a scene segmentation module 340 for generating the overall segmentation of the input video. The scene segmentation module 340 obtains the individual segmentation for each identified entity of the input video from the segment detection module 330 and sorts the individual segmentation of the identified entities according to the timestamps associated with the individual segmentation. From the sorted individual segmentation, the scene segmentation module 340 records the start and end associated with the individual segmentation and generates segments that contain different entities.

Figure 7A:
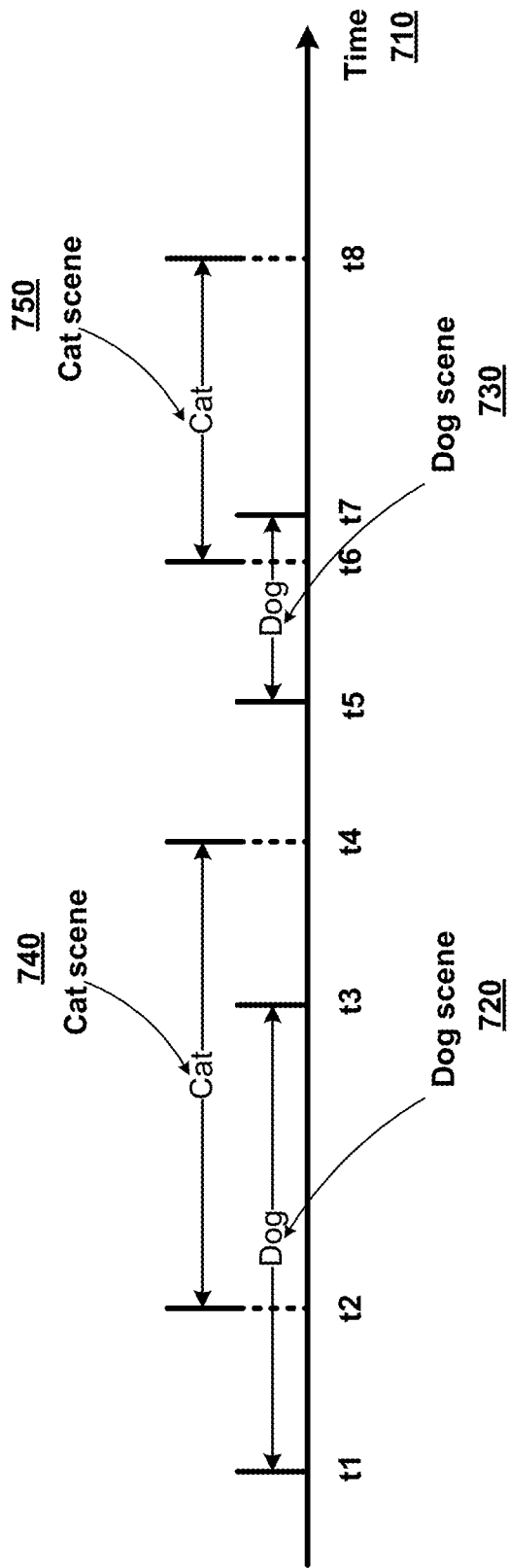
FIG. 7A is an example of generating an overall segmentation of a video based on individual segmentation for identified entities in the video according to one embodiment.

Referring to FIG. 7 now, FIG. 7 is an example of generating an overall segmentation of an input video based on individual segmentation for identified entities in the input video according to one embodiment. The example in FIG. 7 has four individual segments generated by the segmentation detection module 230: segment between time instance $t_1$ and time instance $t_3$ for the dog entity; segment between time instance $t_5$ and time instance $t_7$ for another dog entity; segment between time instance $t_2$ and time instance $t_4$ for the cat entity; segment between time instance $t_6$ and time instance $t_8$ for another cat entity.

The scene segmentation module 340 orders the individual segments of the dog entity and the cat entity according to the start and end timestamps associated with the individual segments as shown in FIG. 7. The scene segmentation module 340 records the 4 start timestamps, i.e., timestamps at time instances $t_1$, $t_2$, $t_5$ and $t_6$, and 4 end timestamps, i.e., timestamps at time instances $t_3$, $t_4$, $t_7$ and $t_8$. The scene segmentation module 340 combines the individual segments for the dog entity and the cat entity according to the ordered start and end timestamps to generate new segments for the input video. For example, ordered timestamps of the individual segments indicates the following six new segments:

segment between timestamps $t_1$ and $t_2$, which is a dog-only segment;

segment between timestamps $t_2$ and $t_3$, which is a cat-and-dog segment;

segment between timestamps $t_3$ and $t_4$, which is a cat-only segment;

segment between timestamps $t_5$ and $t_6$, which is a dog-only segment;

segment between timestamps $t_6$ and $t_7$, which is a cat-and-dog segment;

segment between timestamps $t_7$ and $t_8$, which is a cat-only segment.

Figure 7B:
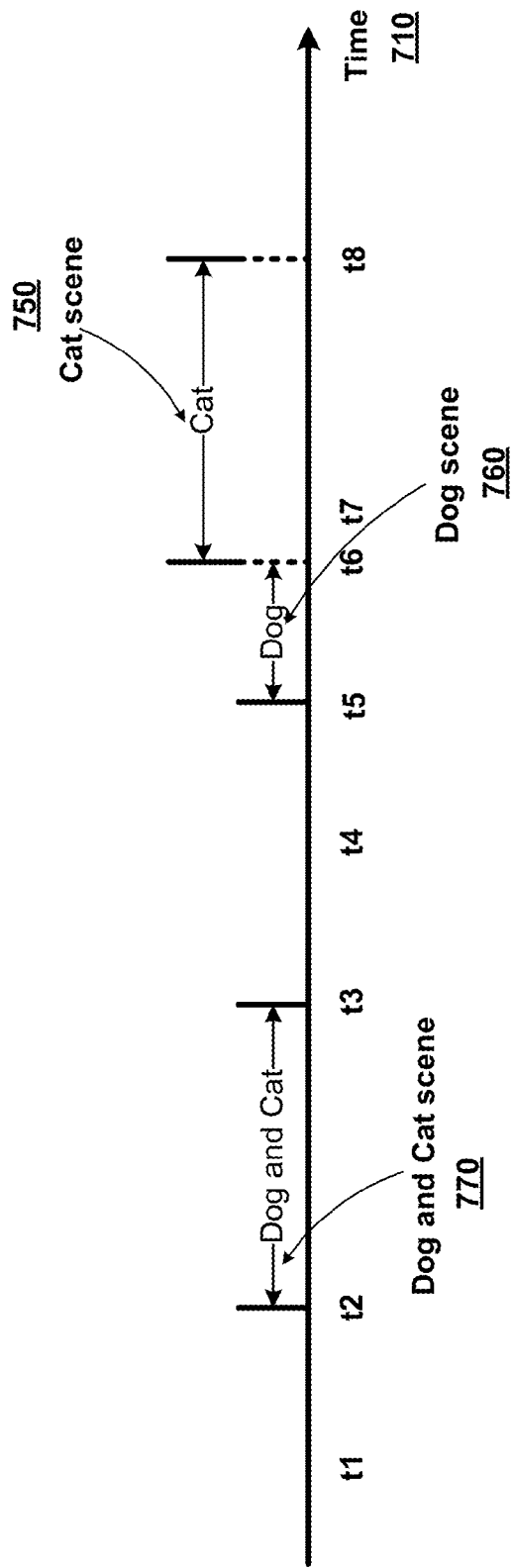
FIG. 7B is an example corresponding to an overall segmentation of a video generation shown in FIG. 7A after sorting the individual segmentation for identified entities.

The scene segmentation module 340 may further sort the new segments and delete a segment that contains a same set of entities as another one. For example, the segment between timestamps $t_1$ and $t_2$ and the segment between timestamps $t_5$ and $t_6$ are both dog-only segments. The scene segmentation module 340 may elect one of these two segments, e.g., the segment between timestamps $t_5$ and $t_6$, to represent a dog-only segment of the input video. Similarly, the scene segmentation module 340 may select the segment timestamps $t_7$ and $t_8$ to represent a cat-only segment. After the further sorting, the scene segmentation module 340 generates the overall segmentation of the input video, which includes three segments: dog-only segment, cat-only segment and cat-and-dog segment. FIG. 7B shows an example of the overall segmentation of the input video after sorting.

In another embodiment, the scene segmentation module 340 may further sort the new segments according to the confidence score associated with an entity. For example, the scene segmentation module 340 ranks the segments of an identified entity, e.g., a dog, based on the corresponding confidence scores of the segments. Responsive to a search query on an entity, the scene segmentation module 340 may return a subset of all segments of the queried entity, each of which has a confidence score exceeding a threshold, or return all segments of the queried entity.

III. Exemplary Operation of Entity Based Temporal Semantic Segmentation

Figure 8:
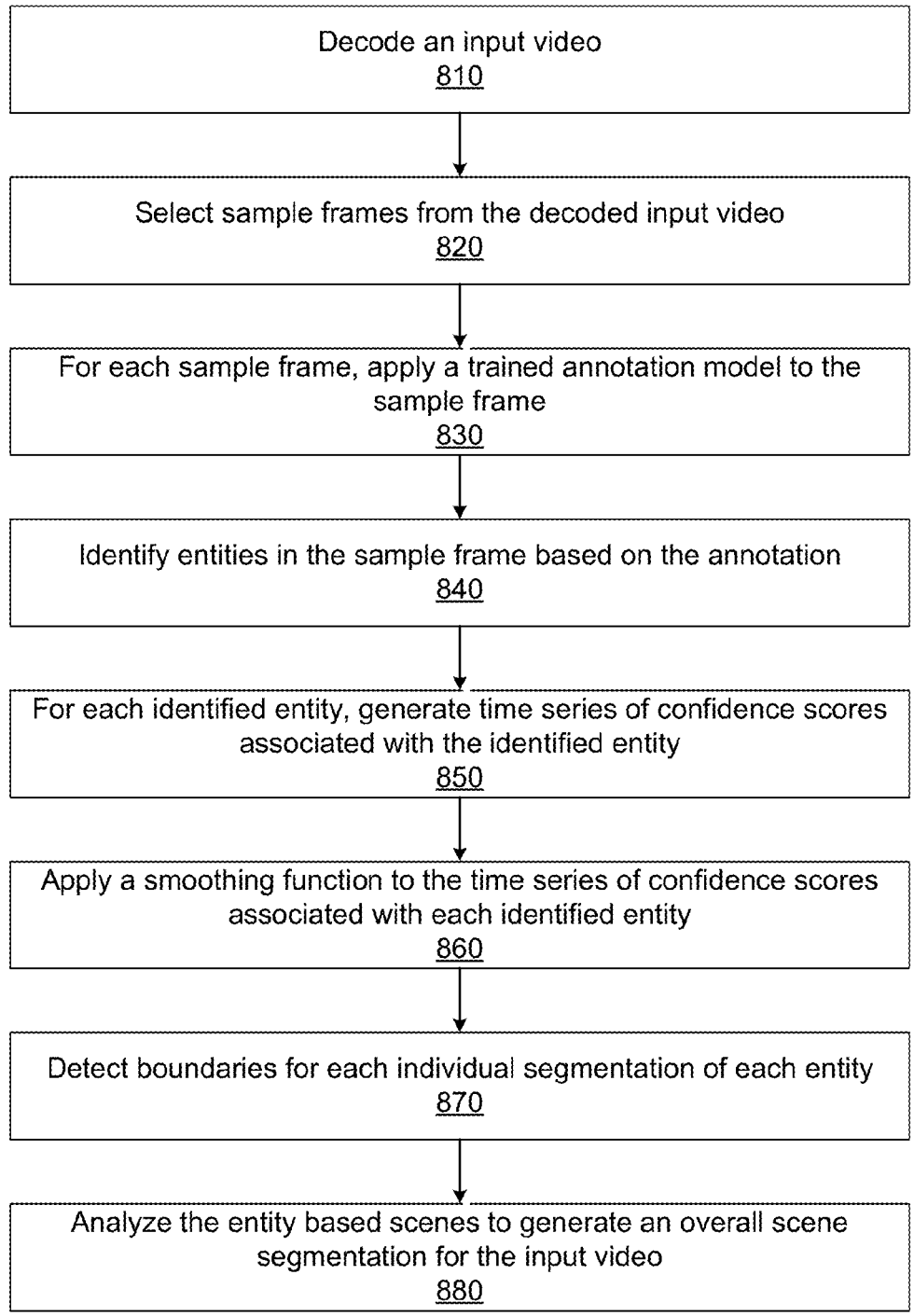
FIG. 8 is a flow chart of entity based temporal segmentation according to one embodiment.

FIG. 8 is a flow chart of entity based temporal segmentation according to one embodiment. Initially, the entity based temporal segmentation module 102 decodes 810 an input video. The decoded input video has multiple video frames, each of which has one or more entities. The entity based temporal segmentation module 102 selects 820 one or more sample video frames for segmentation. For example, the entity based temporal segmentation module 102 selects a video frame from every five video frames of the input video. For each selected video frame, the entity based temporal segmentation module 102 applies 830 a trained annotation model to the selected sample video frame. The entity based temporal segmentation module 102 identifies 840 each entity in each selected sample video frame based on the application of the trained annotation model. Each identified entity in a selected sample video frame has a timestamp, a label of the entity and a confidence score to indicate the likelihood that the entity is accurately identified.

The entity based temporal segmentation module 102 generates 850 a time series for each identified entity, where the time series contains the identified entity at each time instance and its corresponding confidence score across the entire length of the input video. The entity based temporal segmentation module 102 applies 860 a smoothing function to the time series of each entity to eliminate noise generated during the annotation process.

For each identified entity, the entity based temporal segmentation module 102 generates individual segments that contain the identified entity across the entire length of the input video. An individual segment for an entity has a start point and end point, which define the length of the segment. In one embodiment, the entity based temporal segmentation module 102 detects 870 a pair of boundaries defining a segment based on predefined onset and offset threshold values. Based on the reordering and analysis of the individual segments for identified entities, the entity based temporal segmentation module 102 generates an overall segmentation for the entire input video.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

What is claimed is:

1. A method for temporally segmenting a video, the method comprising:
   selecting sample video frames from a plurality of decoded video frames of the video;
   training an annotation model on a corpus of training images with a neural network model;
   annotating each of the selected sample video frames with the trained annotation model, wherein annotating a selected sample video frame comprises:
      applying the trained annotation model to each selected sample video frame;
      identifying one or more entities present in the selected sample video frame based on the application of the trained annotation model, an identified entity of the video representing an object of interest in the selected sample video frame;
      representing each identified entity by a set of annotation parameters;
   segmenting the selected sample video frames into a plurality of segments for each entity of the video based on the annotation of the selected sample video frames, a segment for an entity of the video representing a semantically meaningful spatial-temporal region of the video; and
   generating an overall temporal segmentation of the video based on the plurality of segments of each entity of the video.

2. The method of claim 1, wherein the set of annotation parameters for an entity in the selected sample video frame includes a descriptive label describing the semantics of the entity, a portion of the selected sample video frame containing the entity and a confidence score indicating likelihood that the entity is accurately identified.

3. The method of claim 1, wherein segmenting the selected sample video frames into a plurality of segments for each entity of the video based on the annotation of the selected sample video frames comprises:
   for each entity of the video:
      generating a time series for the entity, the time series comprising a plurality of timestamps of the selected sample video frames containing the entity and corresponding confidence scores of the entity;
      applying a smoothing function to the generated time series of the entity; and
      identifying boundaries for each segment containing the entity based on the confidence scores of the smoothed time series of the entity.

4. The method of claim 3, wherein applying the smoothing function to the generated time series of the entity comprises:
   applying a moving window to the time series of the entity, the moving window being defined by a size and a step, and the moving window selecting a plurality of confidences scores of timestamps that are within the moving window; and
   computing an average confidence score of the confidence scores selected by the moving window.

5. The method of claim 3, wherein identifying boundaries for each segment containing the entity comprises:
   selecting an onset threshold value for the segment, the onset threshold value indicating the start of the segment;

selecting an offset threshold value for the segment, the offset threshold value indicating the end of the segment;

comparing the confidence scores of the smoothed time series of the entity with the onset threshold value and the offset threshold value; and identifying the boundaries of the segment based on the comparison of the confidence scores of the smoothed time series of the entity.

6. A non-transitory computer readable storage medium storing executable computer program instructions for temporally segmenting a video, the computer program instructions comprising instructions that when executed cause a computer processor to:

select sample video frames from a plurality of decoded video frames of the video;

train an annotation model on a corpus of training images with a neural network model;

annotate each of the sample video frame with the trained annotation model, wherein to annotate a selected sample video frame comprises:
apply the trained annotation model to each selected sample video frame;
identify one or more entities present in the selected sample video frame based on the application of the trained annotation model, an identified entity of the video representing an object of interest in the selected sample video frame;
represent each identified entity by a set of annotation parameters;

segment the selected sample video frames into a plurality of segments for each entity of the video based on the annotation of the selected sample video frames, a segment for an entity of the video representing a semantically meaningful spatial-temporal region of the video; and generate an overall temporal segmentation of the video based on the plurality of segments of each entity of the video.

7. The computer readable medium of claim 6, wherein the set of annotation parameters for an entity in the selected sample video frame includes a descriptive label describing the semantics of the entity, a portion of the selected sample video frame containing the entity and a confidence score indicating likelihood that the entity is accurately identified.

8. The computer readable medium of claim 1, wherein the computer program instructions for segmenting the selected sample video frames into a plurality of segments for each entity of the video based on the annotation of the selected sample video frames comprise instructions that when executed cause the computer processor to:

for each entity of the video:
generate a time series for the entity, the time series comprising a plurality of timestamps of the selected sample video frames containing the entity and corresponding confidence scores of the entity;
apply a smoothing function to the generated time series of the entity; and
identify boundaries for each segment containing the entity based on the confidence scores of the smoothed time series of the entity.

9. The computer readable medium of claim 8, wherein the computer program instructions for applying the smoothing function to the generated time series of the entity comprise instructions that when executed cause the computer processor to:

apply a moving window to the time series of the entity, the moving window being defined by a size and a step, and the moving window selecting a plurality of confidences scores of timestamps that are within the moving window; and compute an average confidence score of the confidence scores selected by the moving window.

10. The computer readable medium of claim 9, wherein the computer program instructions for identifying boundaries for each segment containing the entity comprise instructions that when executed cause the computer processor to:

select an onset threshold value for the segment, the onset threshold value indicating the start of the segment;

select an offset threshold value for the segment, the offset threshold value indicating the end of the segment;

compare the confidence scores of the smoothed time series of the entity with the onset threshold value and the offset threshold value; and identify the boundaries of the segment based on the comparison of the confidence scores of the smoothed time series of the entity.

11. A computer system for temporally segmenting a video, the system comprising:

a computer processor to perform steps, comprising:
selecting sample video frames from a plurality of decoded video frames of the video;
training an annotation model on a corpus of training images with a neural network model;
annotating each of the sample video frame with the trained annotation model, wherein annotating a selected sample video frame comprises:
applying the trained annotation model to each selected sample video frame;
identifying one or more entities present in the selected sample video frame based on the application of the trained annotation model, an identified entity of the video representing an object of interest in the selected sample video frame;
representing each identified entity by a set of annotation parameters;
segmenting the selected sample video frames into a plurality of segments for each entity of the video based on the annotation of the selected sample video frames, a segment for an entity of the video reflecting the semantics of the video; and
generating an overall temporal segmentation of the video based on the plurality of segments of each entity of the video.

12. The system of claim 11, wherein the set of annotation parameters for an entity in the selected sample video frame includes a descriptive label describing the semantics of the entity, a portion of the selected sample video frame containing the entity and a confidence score indicating likelihood that the entity is accurately identified.

13. The system of claim 11, wherein segmenting the selected sample video frames into a plurality of segments for each entity of the video based on the annotation of the selected sample video frames comprises:

for each entity of the video:
generating a time series for the entity, the time series comprising a plurality of timestamps of the selected sample video frames containing the entity and corresponding confidence scores of the entity;
applying a smoothing function to the generated time series of the entity; and identifying boundaries for each segment containing the entity based on the confidence scores of the smoothed time series of the entity.

14. The system of claim 13, wherein identifying boundaries for each segment containing the entity comprises:
selecting an onset threshold value for the segment, the onset threshold value indicating the start of the segment;
selecting an offset threshold value for the segment, the offset threshold value indicating the end of the segment;
comparing the confidence scores of the smoothed time series of the entity with the onset threshold value and the offset threshold value; and
identifying the boundaries of the segment based on the comparison of the confidence scores of the smoothed time series of the entity.

* * * * *